United States Patent [19]
Ohshima et al.

[11] Patent Number: 5,594,787
[45] Date of Patent: Jan. 14, 1997

[54] CALL TOLL PROCESSING METHOD AND CALL TOLL PROCESSING APPARATUS

[75] Inventors: Kenichi Ohshima; Jun Ishikawa; Koji Kudoh; Tomoki Nakaya, all of Kawasaki, Japan

[73] Assignee: Fujitsu Limited, Kanagawa, Japan

[21] Appl. No.: 503,941

[22] Filed: Jul. 19, 1995

[30] Foreign Application Priority Data

Jan. 9, 1995 [JP] Japan ................................. 7-001475

[51] Int. Cl.⁶ ............................................... H04M 15/00
[52] U.S. Cl. ........................... 379/114; 379/111; 379/112; 379/113; 379/115; 379/121; 379/125; 379/126
[58] Field of Search .......................... 379/111–115, 121, 379/125–127, 221

[56] References Cited

U.S. PATENT DOCUMENTS

| | | | |
|---|---|---|---|
| 3,956,592 | 5/1976 | Altenburger | 379/127 |
| 4,063,037 | 12/1977 | Heffernan | 379/125 |
| 4,191,860 | 3/1980 | Weber | 379/115 |
| 4,727,577 | 2/1988 | Frey | 379/115 |
| 4,757,267 | 7/1988 | Riskin | 379/113 |
| 5,103,475 | 4/1992 | Shuen | 379/112 |
| 5,425,084 | 6/1995 | Brinskele | 379/125 |

FOREIGN PATENT DOCUMENTS

| | | |
|---|---|---|
| 57-155873 | 9/1982 | Japan . |
| 5-41752 | 2/1993 | Japan . |

*Primary Examiner*—Wellington Chin
*Assistant Examiner*—Vijay Shankar

[57] ABSTRACT

The call toll processing method comprises a calling party toll data input step wherein calling party toll data is input from a toll processing data table that stores calling party toll data determined on the basis of data regarding the distance from the originating subscriber to the originating exchange accommodating the originating subscriber, a location data extraction step wherein location data relating to the terminating exchange accommodating the terminating subscriber having the dialed number input by the originating subscriber is extracted from dialing data, a called party toll data input step wherein called party toll data determined on the basis of data regarding the distance from the terminating subscriber to the terminating exchange is input from the terminating exchange, and a call toll computation step wherein call tolls between the originating subscriber and the terminating subscriber are computed on the basis of at least calling party toll data input in the calling party toll data input step, location data extracted in the location data extraction step, and calling party toll data input in the called party toll data input step.

6 Claims, 16 Drawing Sheets

CALL TOLL PROCESSING METHOD AND CALL TOLL PROCESSING APPARATUS

BACKGROUND OF THE INVENTION

1. Field of the Invention

The present invention relates generally to a call toll processing method and a call toll processing apparatus, and relates particularly to a call toll processing method and a call toll processing apparatus designed taking into consideration distances to subscribers and subscriber's exchanges and distances to trunk exchanges and subordinate exchanges as the object of tolls.

2. Description of the Related Art

Conventionally, call tolls are computed on the basis of location data extracted from transmitted dialing data, the duration from answer to disconnect, the call origination time period and the disconnect time period, and the like, but the distance from the originating subscriber (calling party) to the originating exchange and the distance from the terminating subscriber (called party) to the terminating exchange is not taken into consideration.

The same holds true in cases where trunk exchanges are present between the originating exchange and the terminating exchange.

Thus, for example, even if a high-cost circuit is installed between the originating subscriber and the originating exchange, special expense tolls cannot be made, which constitutes a kind of inequality. This drawback is particularly pronounced when distances between the originating subscriber and the originating exchange are great and distances between the terminating subscriber and the terminating exchange are great.

The toll control method disclosed in Japanese Laid-Open Patent Application 5-41752 (Toll Control Method for Call Toll Area Number in Toll Exchange Offices) shown in FIG. 16, which takes into consideration distances between originating subscribers and terminating exchanges, will be discussed from this standpoint.

However, the conventional toll control method mentioned above cannot deal with cases in which a high-cost circuit has been installed between the terminating exchange and the partner subscriber, so certain inequalities remain.

SUMMARY OF THE INVENTION

With the foregoing in view, it is the first object of the present invention to provide a call toll processing method that takes into consideration distances to subscribers and subscriber's exchanges as the object of tolls.

Additionally, it is the second object of the present invention to provide a call toll processing method that takes into consideration distances to trunk exchanges and subordinate exchanges as the object of tolls.

Additionally, it is the third object of the present invention to provide a call toll processing apparatus that takes into consideration distances to subscribers and subscriber's exchanges as the object of tolls.

Additionally, it is the third object of the present invention to provide a call toll processing apparatus that takes into consideration distances to trunk exchanges and subordinate exchanges as the object of tolls.

First Call Toll Processing Method of the Invention

The first call toll processing method of the present invention is designed as follows in order to solve the first problem noted above.

Specifically, it is provided with a calling party toll data input step, a location data extraction step, a called party toll data input step, and a call toll computation step (corresponding to claim 1).

Calling Party Toll Data Input Step

The calling party toll data input step inputs calling party toll data from a toll processing data table storing calling party toll data determined on the basis of data regarding the distance from the originating subscriber to the originating exchange accommodating the originating subscriber.

Location Data Extraction Step

The location data extraction step extracts from dialing data location data relating to the terminating exchange accommodating the terminating subscriber having the dialed number input by the originating subscriber.

Called Party Toll Data Input Step

The called party toll data input step inputs from the terminating exchange called party toll data determined on the basis of data regarding the distance from the terminating subscriber to the terminating exchange.

Call Toll Computation Step

The call toll computation step computes call tolls between the originating subscriber and the terminating subscriber on the basis of at least calling party toll data input in the calling party toll data input step, location data extracted in the location data extraction step, and calling party toll data input in the called party toll data input step.

In this way, by the first call toll processing method of the present invention, call tolls between the originating subscriber and the terminating subscriber are computed on the basis of at least calling party toll data input in the calling party toll data input step, location data extracted in the location data extraction process, and calling party charge data input in the called party toll data input step.

DESCRIPTION OF THE PREFERRED EMBODIMENT

Before describing specific embodiments, an outline of the structure of the invention of this application will be described along with the means employed for solving the problems addressed by the present invention.

First Call Toll Processing Method of the Invention

Figure 1:
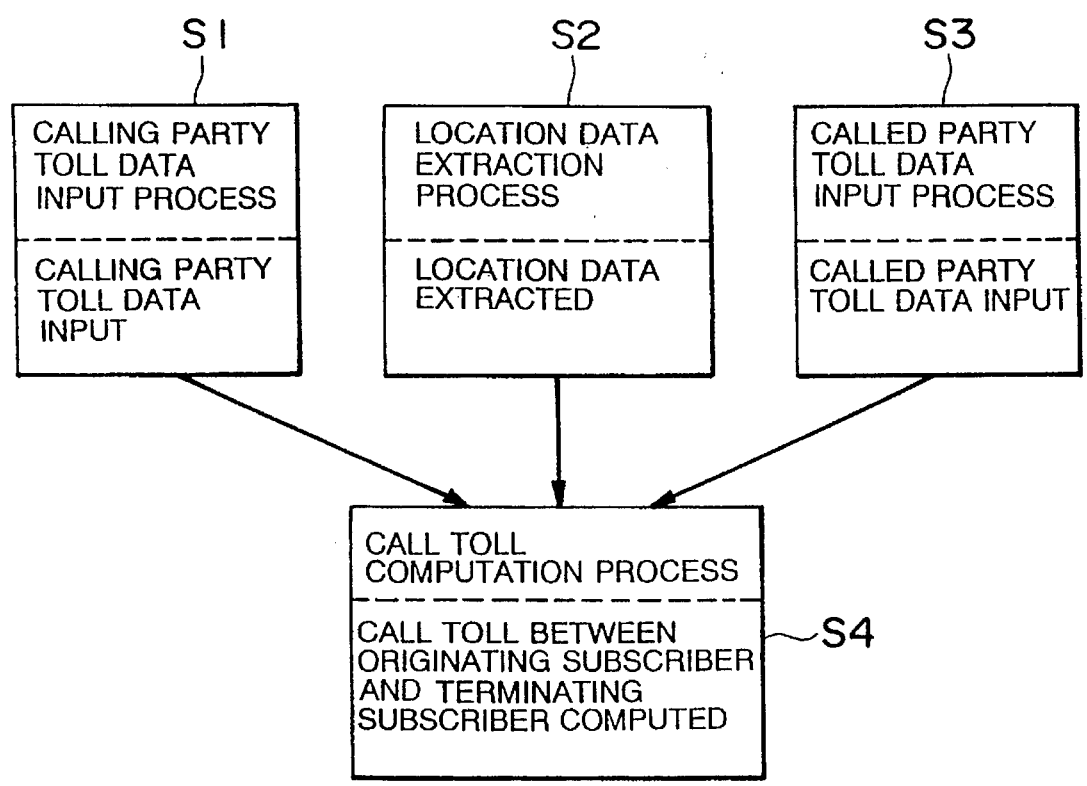
FIG. 1 is a basic principle flow chart depicting the first call toll processing method.

The first call toll processing method of the invention, is designed in the following way in order to solve the first problem noted above. FIG. 1 is a basic principle flow chart corresponding to the first call toll processing method of the present invention.

Specifically, a calling party toll data input step S1, a location data extraction process S2, a called party toll data input step S3, and a call toll computation step S4 are provided (corresponding to claim 1).

Calling Party Toll Data Input Step S1

The calling party toll data input step S1 inputs calling party toll data from a toll processing data table storing calling party toll data determined on the basis of data regarding the distance from the originating subscriber to the originating exchange accommodating the originating subscriber.

Location Data Extraction Step S2

The location data extraction step S2 extracts from dialing data location data relating to the terminating exchange accommodating the terminating subscriber having the dialed number input by the originating subscriber.

Called Party Toll Data Input Step S3

The called party toll data input step S3 inputs from the terminating exchange called party toll data determined on the basis of data regarding the distance from the terminating subscriber to the terminating exchange.

Call Toll Computation Step S4

The call toll computation step S4 computes call tolls between the originating subscriber and the terminating subscriber on the basis of at least calling party toll data input in the calling party toll data input step S1, location data extracted in the location data extraction step S2, and called party toll data input in the called party toll data input step S3.

In this way, by the first call toll processing method of the present invention, call tolls between the originating subscriber and the terminating subscriber are computed on the basis of at least calling party toll data input in the calling party toll data input step S1, location data extracted in the location data extraction process S2, and called party toll data input in the called party toll data input step S3.

Second Call Toll Processing Method of the Invention

The second call toll processing method of the invention is designed in the following way in order to solve the first problem noted above.

Specifically, in the first call toll processing method, the calling party toll data is determined by which of a plurality of provided sections data regarding the distance from the originating subscriber to the originating exchange belongs to, and called party toll data is determined by which of a plurality of provided sections data regarding the distance from the terminating subscriber to the terminating exchange belongs to (corresponds to claim 2).

In this way, by the second call toll processing method of the present invention, calling party toll data and called party toll data are established as discrete values in the first call toll processing method.

Third Call Toll Processing Method of the Invention

The third call toll processing method of the invention is designed in the following way in order to solve the first problem noted above.

Specifically, in the first call toll processing method, call tolls are computed in the call toll computation step S4 taking into consideration the call time period and the call day (corresponds to claim 3)

In this way, by the third call toll processing method of the present invention, call tolls in the first call toll processing method are computed taking into consideration the call time period and the call date Fourth Call Toll Processing Method of the Invention The fourth call toll processing method of the invention is designed in the following way in order to solve the first problem noted above.

Specifically, in the first call toll processing method, 1) when the dial number of the terminating subscriber is input by the originating subscriber the calling party toll data input step S1 and the location data extraction step S2 are executed, 2) next, dialing data is transmitted to the terminating exchange and ringing mode is established, and when an answer signal is subsequently received the current time is established as the answering time and the called party toll data input step S3 is executed, after which conversation mode is assumed, 3) when a disconnect signal from either the originating subscriber or the terminating subscriber is detected, the time of detection is recorded as the disconnect time, and 4) next, in the case of calling party disconnect, a disconnect signal is transmitted to the terminating exchange and a circuit opening process is performed, after which the call duration is computed from the answering time and the disconnect time and the call toll computation step S4 is executed (corresponds to claim 4).

In this way, by the fourth call toll processing method of the invention, the calling party toll data input step S1, the location data extraction process S2, the called party toll data input step S3, and the call toll computation step S4 of the first call toll processing method are executed in a specified sequence.

Fifth Call Toll Processing Method of the Invention

Figure 2:
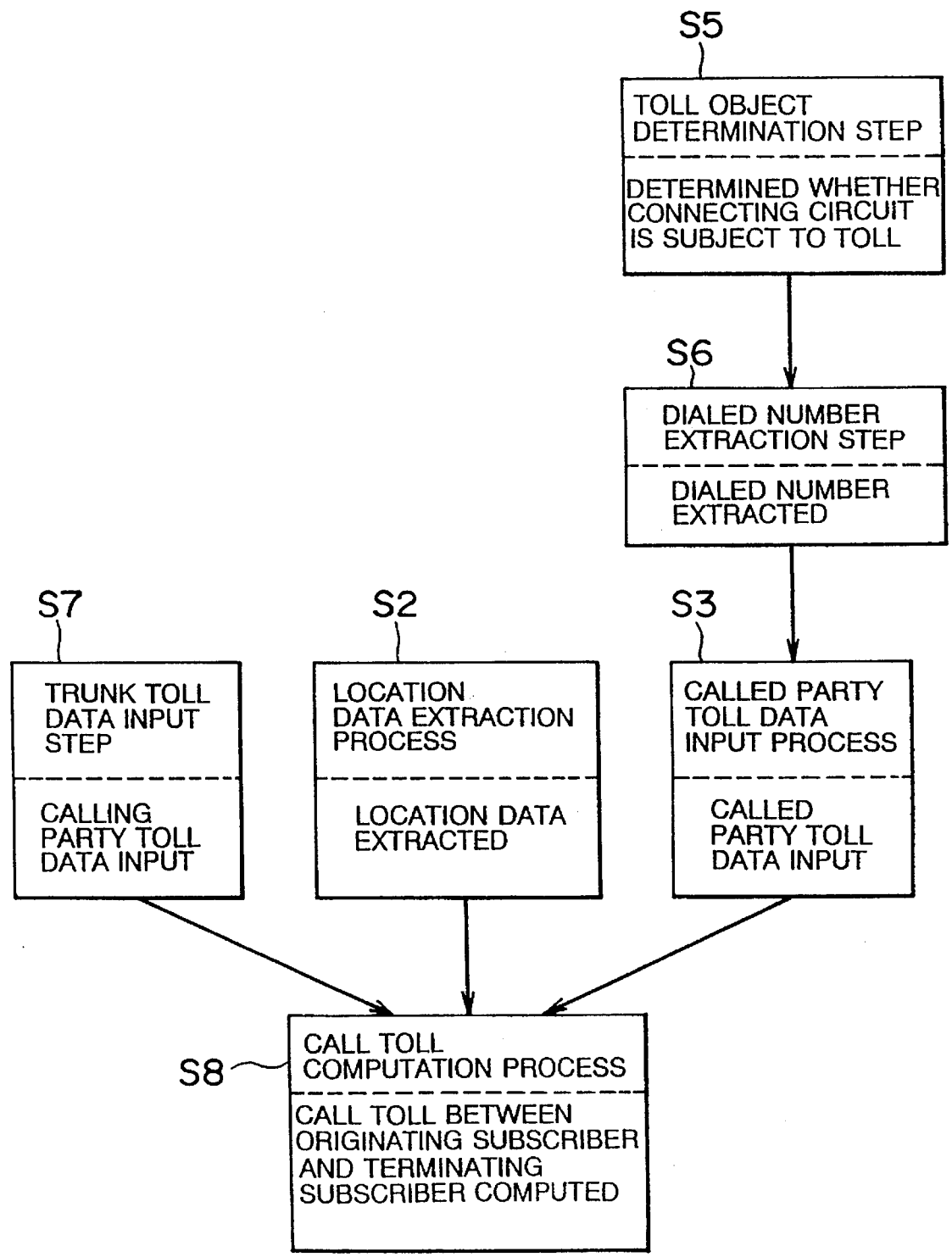
FIG. 2 is a basic principle flow chart depicting the fifth call toll processing method.

The fifth call toll processing method of the invention is designed in the following way in order to solve the second problem noted above. FIG. 2 is a basic principle flow chart depicting the fifth call toll processing method of the present invention.

Specifically, a toll object determination step S5, a dialed number extraction step S6, a trunk toll data input step S7, a location data extraction step S2, a called party toll data input step S3, and a call toll computation step S8 are provided.

Toll Object Determination Step S5

The toll object determination step S5 determines whether connecting circuits between subordinate exchanges and trunk exchanges are subject to tolls.

Dialed Number Extraction Step S6

The dialed number extraction step S6 extracts dialed numbers from received dialing data when it is determined in the toll object determination step S5 that a circuit is subject to toll.

Trunk Toll Data Input Step S7

The trunk toll data input step S7 inputs trunk toll data from a toll processing data table storing trunk toll data determined on the basis of data regarding the distance from a subordinate exchange to a trunk exchange.

Location Data Extraction Step S2

The location data extraction step S2 extracts from the dialing data location data relating to the terminating exchange accommodating the terminating subscriber having the dialed number extracted in the dialed number extraction step S6.

Called Party Toll Data Input Step S3

The called party toll data input step S3 inputs from the terminating exchange called party toll data determined on the basis of data regarding the distance from the terminating subscriber to the terminating exchange.

Call Toll Computation Step S8

The call toll computation step S8 computes call tolls between an originating subscriber on a subordinate exchange and a terminating subscriber on a terminating exchange on the basis of at least trunk toll data input in the trunk toll data input step S7, location data extracted in the location data extraction step S2, and called party toll data input in the called party toll data input step S3.

In this way, by the fifth call toll processing method of the invention call tolls between an originating subscriber on a subordinate exchange and a terminating subscriber on a terminating exchange are computed on the basis of at least trunk toll data input in the trunk toll data input step S7, location data extracted in the location data extraction step S2, and called party toll data input in the called party toll data input step S3.

Sixth Call Toll Processing Method of the Invention

The sixth call toll processing method of the invention is designed in the following way in order to solve the second problem noted above.

In the fifth call toll processing method, the trunk toll data is determined by which of a plurality of provided sections data regarding the distance from the subordinate exchange to the trunk exchange belongs to, and the called party toll data is determined by which of a plurality of provided sections data regarding the distance from the terminating subscriber to the terminating exchange belongs to (corresponds to claim 6).

In this way, by the sixth call toll processing method of the present invention, trunk toll data and called party toll data are established as discrete values in the fifth call toll processing method.

Seventh Call Toll Processing Method of the Invention

The seventh call toll processing method of the invention is designed in the following way in order to solve the second problem noted above.

In the fifth call toll processing method, call tolls are computed in the call toll computation step S8 taking into consideration the call time period and the call day (corresponds to claim 7)

In this way, by the seventh call toll processing method of the present invention, call tolls in the fifth call toll processing method are computed taking into consideration the call time period and the call date.

Eighth Call Toll Processing Method of the Invention

The eighth call toll processing method of the invention is designed in the following way in order to solve the second problem noted above.

Specifically, in the fifth call toll processing method, 1) when dialing data is received from a subordinate exchange, the toll object determination step S5 and the dialed number extraction step S6 are executed, 2) next, dialing data is transmitted to the terminating exchange and ringing mode is established, and when an answer signal is subsequently received the current time is established as the answering time, the answer signal is transmitted to the subordinate exchange, and the called party toll data input step S3 is executed, after which conversation mode is assumed, 3) when a disconnect signal from either the subordinate exchange or the terminating exchange is detected, the time of detection is recorded as the disconnect time, and 4) next, in the case of calling party disconnect, a disconnect signal is transmitted to the terminating exchange and a circuit opening process is performed, after which the call duration is computed from the answering time and the disconnect time and the call toll computation step S8 is executed (corresponds to claim 8).

In this way, by the eighth call toll processing method of the invention, the toll object determination step S5, the dialed number extraction step S6, the called party toll data input step S3, and the call toll computation step S8 of the fifth call toll processing method are executed in a specified sequence.

Ninth Call Toll Processing Method of the Invention

The ninth call toll processing method of the invention is designed in the following way in order to solve the second problem noted above.

Specifically, in the fifth call toll processing method, a calling party toll data input step S9, whereby calling party data determined on the basis of data regarding the distance to the subordinate exchange from an originating subscriber connected to the subordinate exchange and who originates dialing is input from the subordinate exchange, is provided. In the call toll computation step S8, call tolls are computed taking into consideration the calling party toll data input in the calling party toll data input step S9.

In this way, by the ninth call toll processing method of the invention, in the call toll computation step S8 of the fifth call toll processing method call tolls are computed taking into consideration the calling party toll data input in the calling party toll data input step S9.

First Call Toll Processing Apparatus of the Invention

Figure 3:
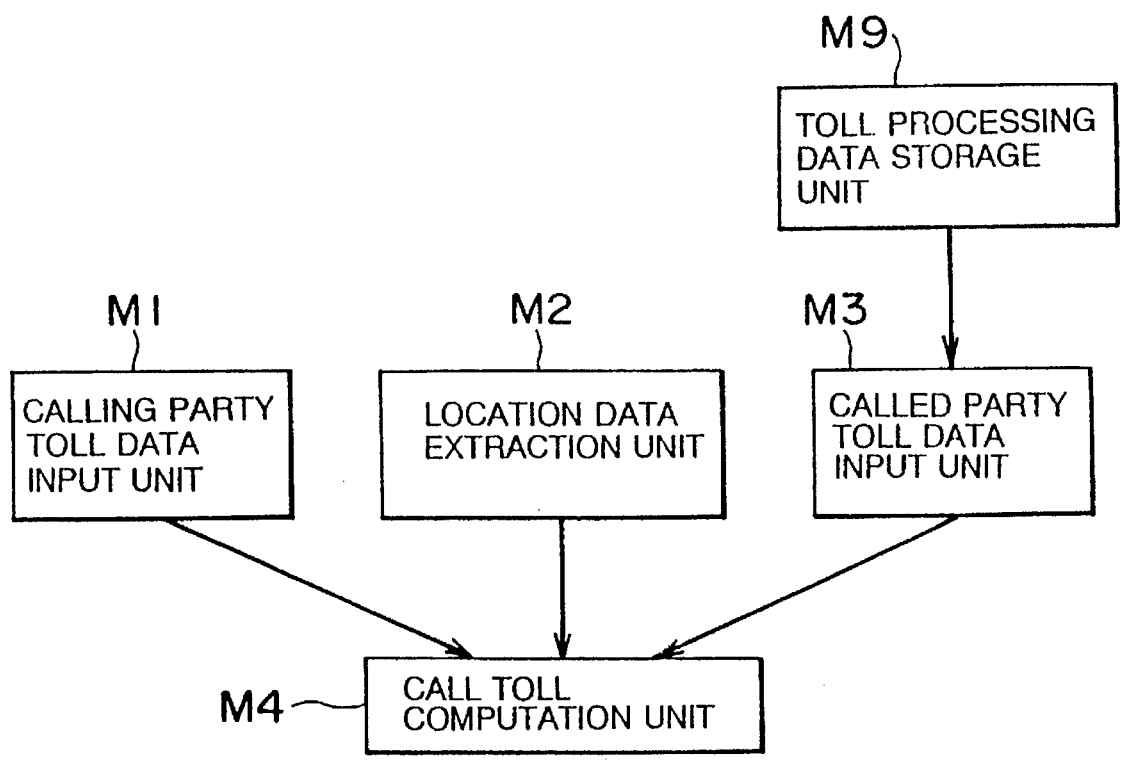
FIG. 3 is a basic principle block diagram depicting the first call toll processing apparatus.

The first call toll processing apparatus of the invention is designed in the following way in order to solve the third problem noted above. FIG. 3 is a basic principle block diagram depicting the first call toll processing apparatus.

Specifically, a toll processing data storage unit M9, a calling party toll data input unit M1, a location data extraction unit M2, a called party toll data input unit M3, and a call toll computation unit M4 are provided (corresponds to claim 10).

Toll Processing Data Storage Unit M9

The toll processing data storage unit M9 stores calling party toll data determined on the basis of data regarding the distance from the originating subscriber to the originating exchange accommodating this originating subscriber.

Calling Party Toll Data Input Unit M1

The calling party toll data input unit M1 inputs calling party toll data from the toll processing data storage unit M9.

Location Data Extraction Unit M2

The location data extraction unit M2 extracts from dialing data location data regarding the terminating exchange storing the terminating subscriber having the dialed number input by the originating subscriber.

Called Party Toll Data Input Unit M3

The called party toll data input unit M3 inputs from the terminating exchange called party toll data determined on the basis of data regarding the distance from the terminating subscriber to the terminating exchange.

Call Toll Computation Unit M4

The call toll computation unit M4 computes call tolls between an originating subscriber and a terminating subscriber on the basis of at least calling party toll data input by the calling party toll data input unit M1, location data extracted by the location data extraction unit M2, and called party toll data input by the called party toll data input unit M3.

In this way, by the first call toll processing apparatus of the invention, call tolls between an originating subscriber and a terminating subscriber are computed by the call toll computation unit M4 on the basis of at least calling party toll data input by the calling party toll data input unit M1, location data extracted by the location data extraction unit M2, and called party toll data input by the called party toll data input unit M3.

In this way, by the first call toll processing apparatus of the invention, call tolls between an originating subscriber and a terminating subscriber are computed on the basis of at least calling party toll data input by the calling party toll data input unit M1, location data extracted by the location data extraction unit M2, and called party toll data input by the called party toll data input unit M3.

Second Call Toll Processing Apparatus of the Invention

The second call toll processing apparatus of the invention is designed in the following way in order to solve the third problem noted above.

Specifically, in the first call toll processing apparatus, the calling party toll data is determined by which of a plurality of provided sections data regarding the distance from the originating subscriber to the originating exchange belongs to, and called party toll data is determined by which of a plurality of provided sections data regarding the distance from the terminating subscriber to the terminating exchange belongs to (corresponds to claim 11).

In this way, by the second call toll processing apparatus, calling party toll data and called party toll data are established as discrete values in the first call toll processing apparatus.

Third Call Toll Processing Apparatus of the Invention

The third call toll processing apparatus of the invention is designed in the following way in order to solve the third problem noted above.

Specifically, in the first call toll processing apparatus, call tolls are computed by the call toll computation unit M4 taking into consideration the call time period and the call day (corresponds to claim 12).

In this way, by the third call toll processing apparatus of the invention, call tolls are computed in the first call toll processing apparatus taking into consideration the call time period and the call day.

Fourth Call Toll Processing Apparatus of the Invention

Figure 4:
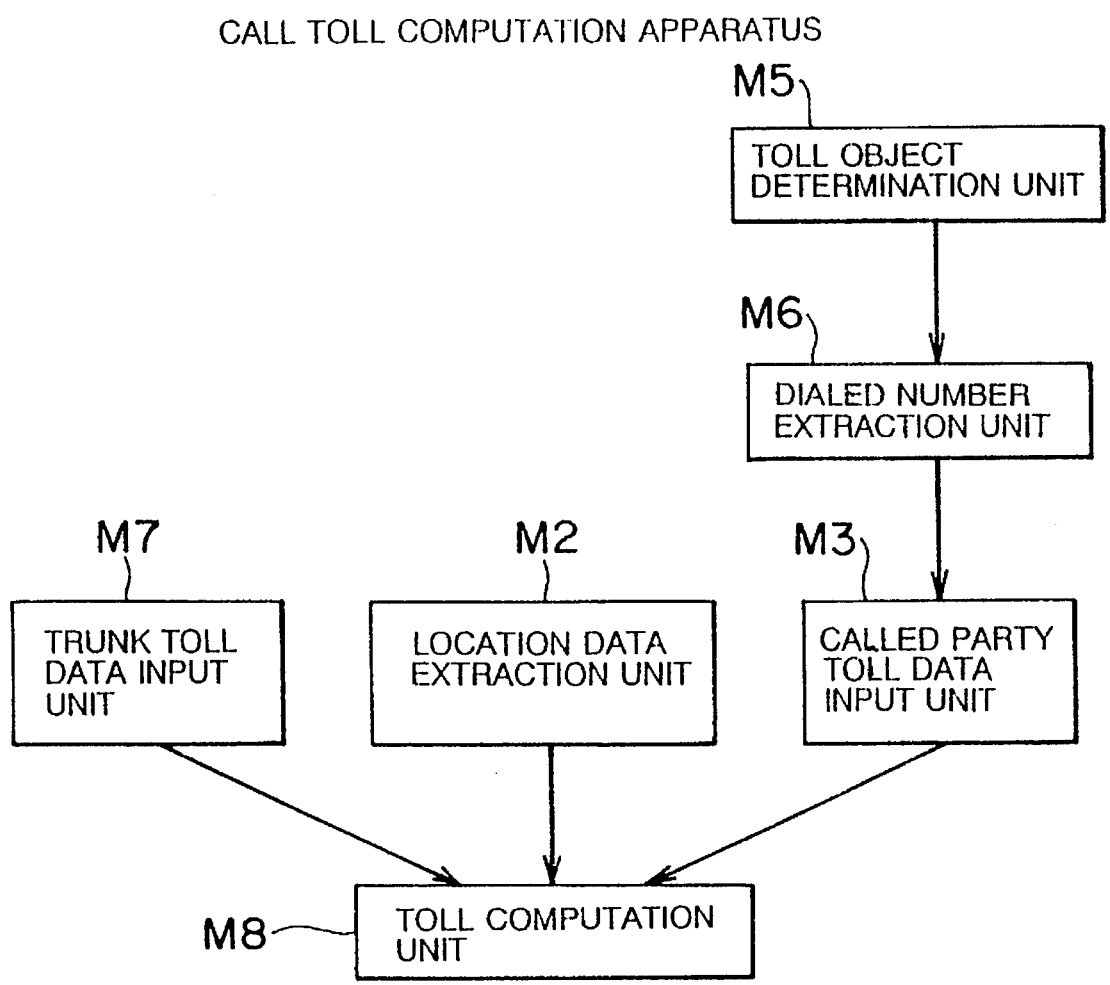
FIG. 4 is a basic principle block diagram depicting the fourth call toll processing apparatus.

The fourth call toll processing apparatus of the invention is designed in the following way in order to solve the fourth problem noted above. FIG. 4 is a basic principle block diagram corresponding to the fourth call toll processing apparatus of the invention.

Specifically, a toll object determination unit M5, a dialed number extraction unit M6, a trunk toll data input unit M7, a location data extraction unit M2, a called party toll data input unit M3, and a call toll computation unit M8 are provided (corresponds to claim 13).

Toll Object Determination Unit M5

The toll object determination unit M5 determines whether connecting circuits between subordinate exchanges and trunk exchanges are subject to tolls.

Dialed Number Extraction Unit M6

The dialed number extraction unit M6 extracts dialed numbers from received dialing data when it has been determined by the toll object determination unit M5 that a circuit is subject to toll.

Trunk Toll Data Input Unit M7

The trunk toll data input unit M7 inputs trunk toll data from a toll processing data table storing trunk toll data determined on the basis of data regarding the distance from a subordinate exchange to a trunk exchange.

Location Data Extraction Unit M2

The location data extraction unit M2 extracts from dialing data location data relating to the terminating exchange accommodating the terminating subscriber having the dialed number extracted by the dialed number extraction unit M6.

Called Party Toll Data Input Unit M3

The called party toll data input unit M3 inputs from the terminating exchange called party toll data determined on the basis of data regarding the distance from the terminating subscriber to the terminating exchange.

Call Toll Computation Unit M8

The call toll computation unit M8 computes call tolls between an originating subscriber on a subordinate exchange and a terminating subscriber on a terminating exchange on the basis of at least trunk toll data input by the trunk toll data input unit M7, location data extracted by the location data extraction unit M2, and called party toll data input by the called party toll data input unit M3.

In this way, by the fourth call toll processing apparatus of the invention, call tolls between an originating subscriber on a subordinate exchange and a terminating subscriber on a trunk exchange are computed by the call toll computation unit M8 on the basis of at least trunk toll data input by the trunk toll data input unit M7, location data extracted by the location data extraction unit M2, and called party toll data input by the called party toll data input unit M3.

Fifth Call Toll Processing Apparatus of the Invention

The fifth call toll processing apparatus of the invention is designed in the following way in order to solve the fourth problem noted above.

Specifically, in the fourth call toll processing apparatus, the trunk toll data is determined by which of a plurality of provided sections data regarding the distance from the subordinate exchange to the trunk exchange belongs to, and the called party toll data is determined by which of a plurality of provided sections data regarding the distance from the terminating subscriber to the terminating exchange belongs to (corresponds to claim 14).

In this way, by the fifth call toll processing apparatus of the invention, trunk toll data and called party toll data are established as discrete values in the fourth call toll processing apparatus.

Sixth Call Toll Processing Apparatus of the Invention

The sixth call toll processing apparatus of the invention is designed in the following way in order to solve the fourth problem noted above.

Specifically, in the fourth call toll processing apparatus, call tolls are computed by the call toll computation unit M8 taking into consideration the call time period and the call day (corresponds to claim 15).

In this way, by the sixth call toll processing apparatus of the invention, call tolls are computed taking into consideration the call time period and the call day.

Seventh Call Toll Processing Apparatus of the Invention

The seventh call toll processing apparatus of the invention is designed in the following way in order to solve the fourth problem noted above.

Specifically, in the fourth call toll processing apparatus, a calling party toll data input unit M9 that inputs from the subordinate exchange calling party data determined on the basis of data regarding the distance to the subordinate exchange from an originating subscriber connected to the subordinate exchange who originates dialing is provided, and the call toll computation unit M8 computes call tolls taking into consideration the calling party toll data input from the calling party toll data input unit (corresponds to claim 16).

In this way, by the seventh call toll processing apparatus of the invention, call tolls are computed by the call toll computation unit M8 in the fourth call toll processing apparatus taking into consideration the calling party toll data input by the calling party toll data input unit M9.

DESCRIPTION OF THE PREFERRED EMBODIMENTS

A first and a second embodiment of the present invention will be described, referring to the appended drawings.
Outline of the First Embodiment The first embodiment is an example of processing a call toll between an originating subscriber located in originating toll area B and a terminating subscriber located in terminating toll area P or Q.

Figure 5:
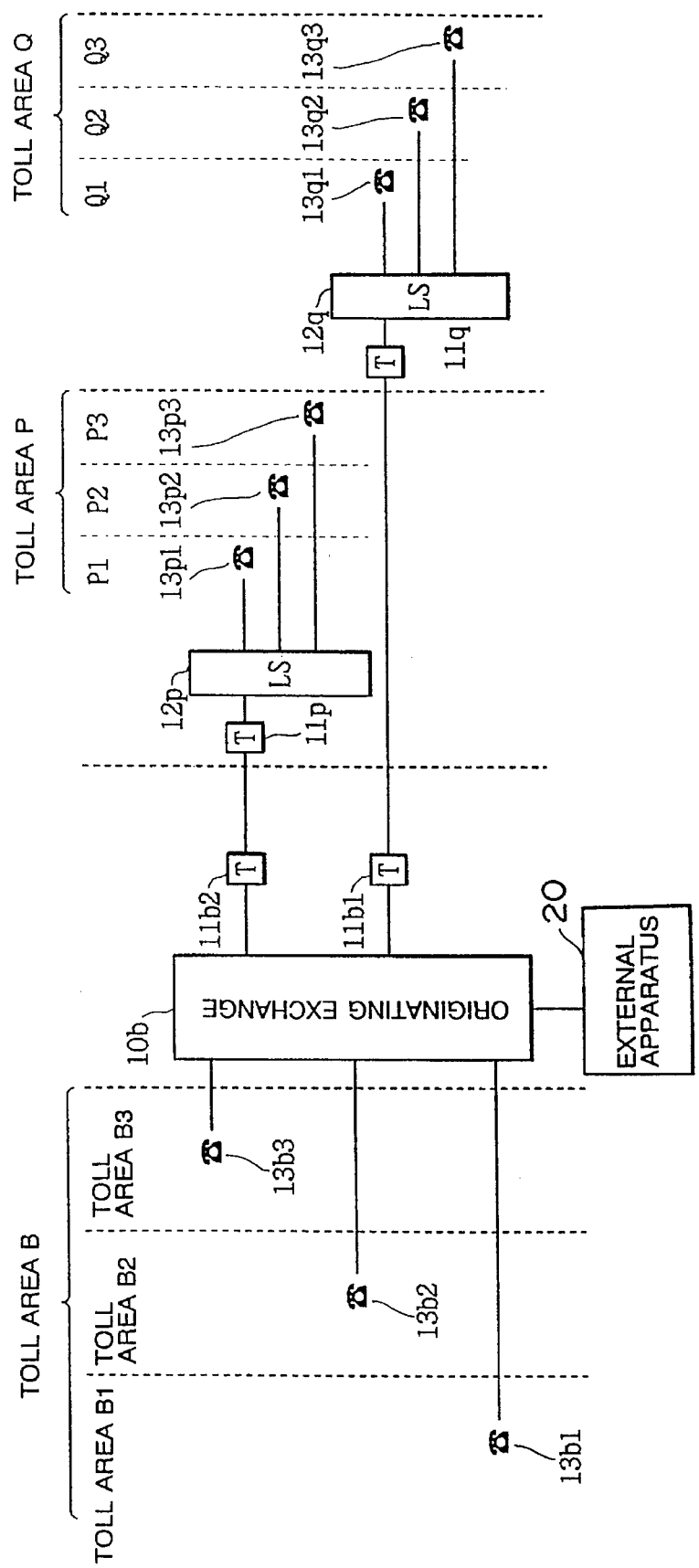
FIG. 5 is a system structure diagram of the first embodiment.

Originating toll area B comprises three toll areas, B1, B2, and B3; terminating toll areas P and Q each comprise three toll areas, P1, P2, and P3 and Q1, Q2, and Q3, respectively.
System Structure of First Embodiment The system of the first embodiment is constructed providing the following elements (A) through (E), as depicted in FIG. 5.
(A) Telephones 13b1, 13b2, 13b3

Figure 6:
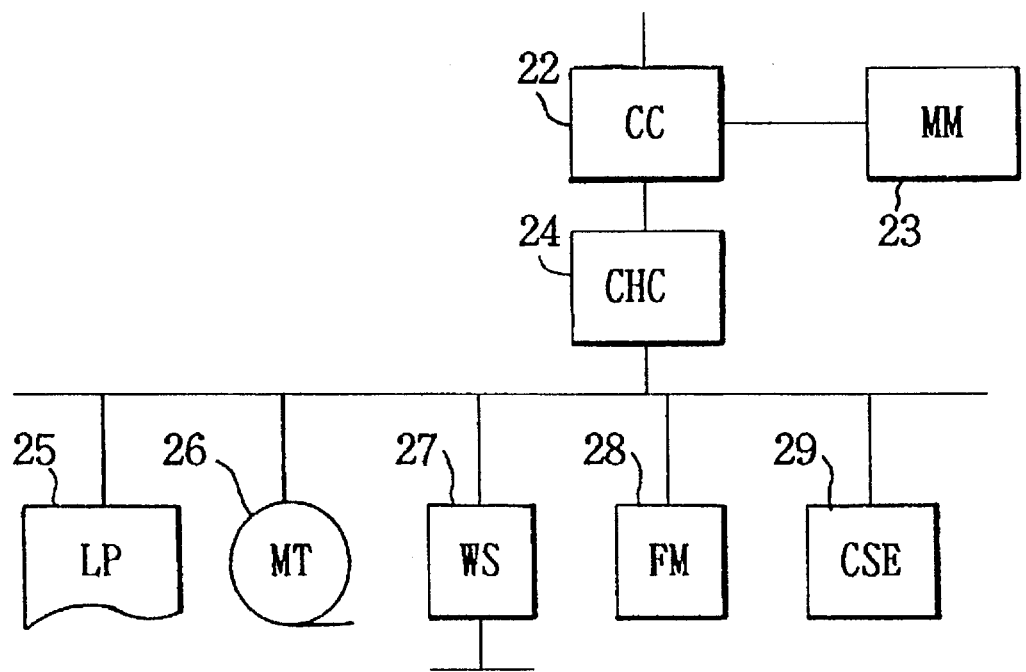
FIG. 6 is a detail structure diagram of an external apparatus for connection to the originating exchange of the first embodiment.

The telephones 13b1, 13b2, and 13b3 indicate originating subscribers located in originating toll areas B1, B2, and B3, respectively. In FIG. 5, telephones 13b1, 13b2, and 13b3 are each depicted as single units, but it would be possible to install a plurality of units. Telephones 13b1, 13b2, and 13b3 may alternatively be fax machines, modem-equipped computers or word processors, or the like.
(B) Originating Exchange 10b The originating exchange 10b accommodates telephones 13b1, 13b2, and 13b3. The originating exchange 10b corresponds to the subscriber's line (accommodating) exchange. An external apparatus 20 is connected to the originating exchange 10b; this external apparatus 20 comprises (a) through (c), below, as depicted in FIG. 6.

(a) Central Controller (CC) 22

The central controller 22 is connected to the originating exchange 10b and executes a call toll processing program.

(b) Main Memory (MM) 23

The main memory 23 is connected to the central controller 22 and stores in memory data and the program used for call toll processing program.

(c) Channel Controller (CHC) 24

The channel controller 24 is connected to the central controller 22 and controls interface between a line printer (LP) 25, a magnetic tape storage device (MT) 26, a work station (WS) 27, a file memory (FM) 28, and common channel signaling equipment (CSE) 29.

Figure 7:
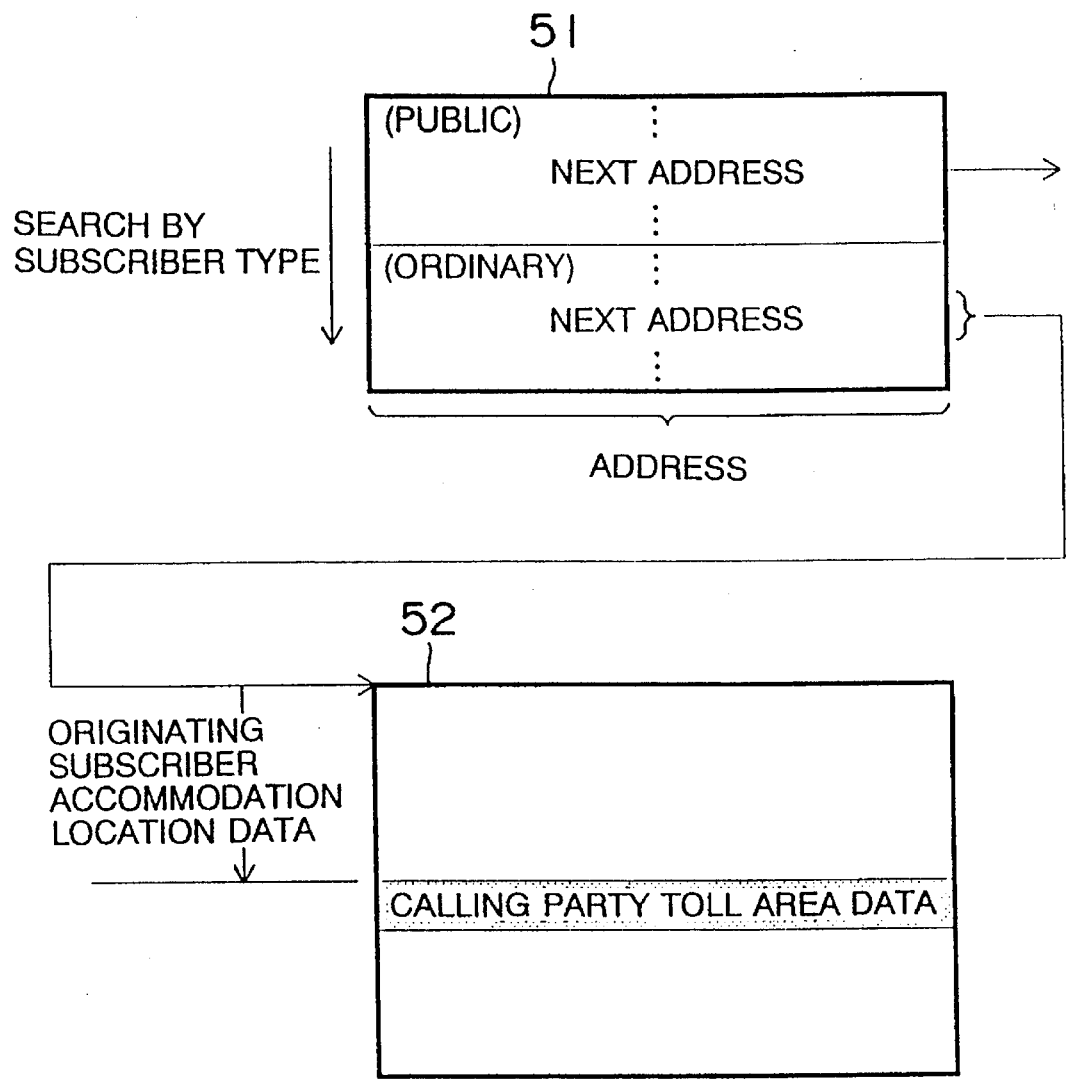
FIG. 7 is a diagram depicting the subscriber-classified toll process table of the first embodiment.
Figure 8:
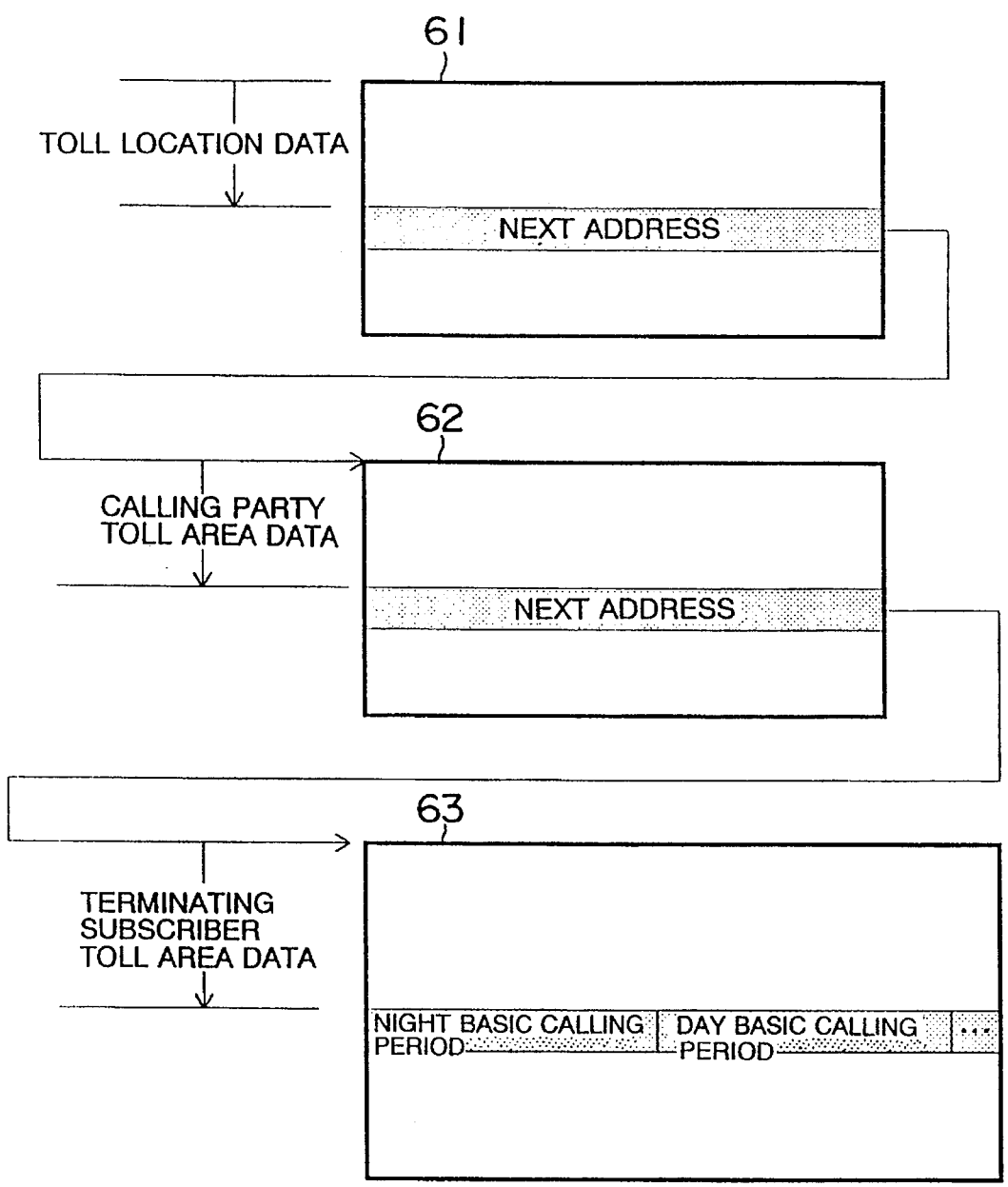
FIG. 8 is a diagram depicting the distance-classified toll process table of the first embodiment.
Figure 9:
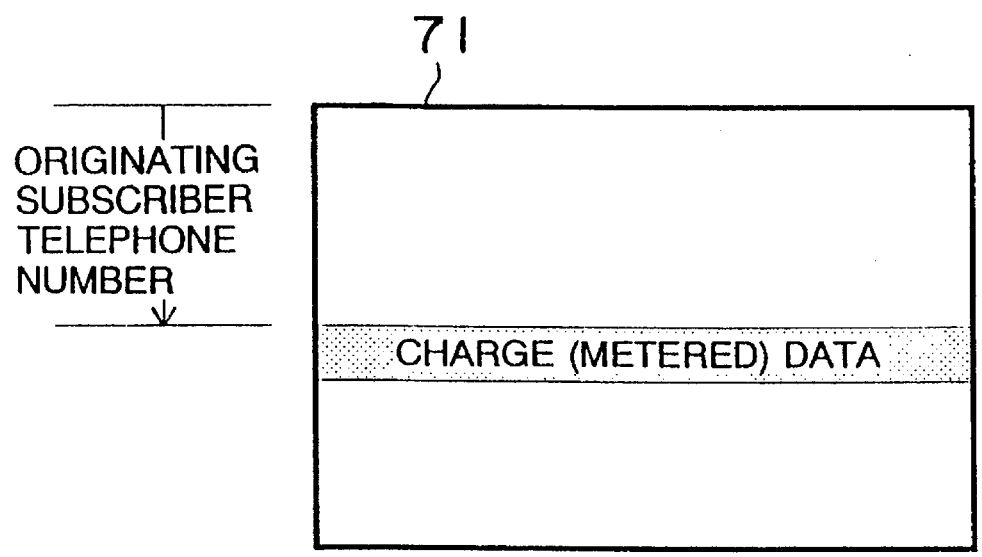
FIG. 9 is a diagram depicting the charge record data table of the first and second embodiments.

The main memory 23 and the file memory 28 store the subscriber-classified toll processing table depicted in FIG. 7, the distance-classified toll processing table depicted in Figure in FIG. 8, and the charge record data table depicted in FIG. 9. Methods for using these table will be described in the section on operating procedure.
(C) Trunks 11b1, 11b2, 11p, 11q Trunks 11b1 and 11b2 are connected to the originating exchange 10b.

Trunk 11p is connected to trunk 11b2 and connected to terminating exchange 12p.

Trunk 11q is connected to trunk 11b1 and connected to terminating exchange 12q.
(D) Terminating Exchanges 12p, 12q Terminating exchange 12p accommodates telephones 13p1, 13p2, and 13p3, which are terminating subscribers located in terminating toll areas P1, P2, and P3, respectively.

Terminating exchange 12q accommodates telephones 13q1, 13q2, and 13q3, which are terminating subscribers located in terminating toll areas Q1, Q2, and Q3, respectively
(E) Telephones 13p1–13p3, 13q1–13q3

Figure 10:
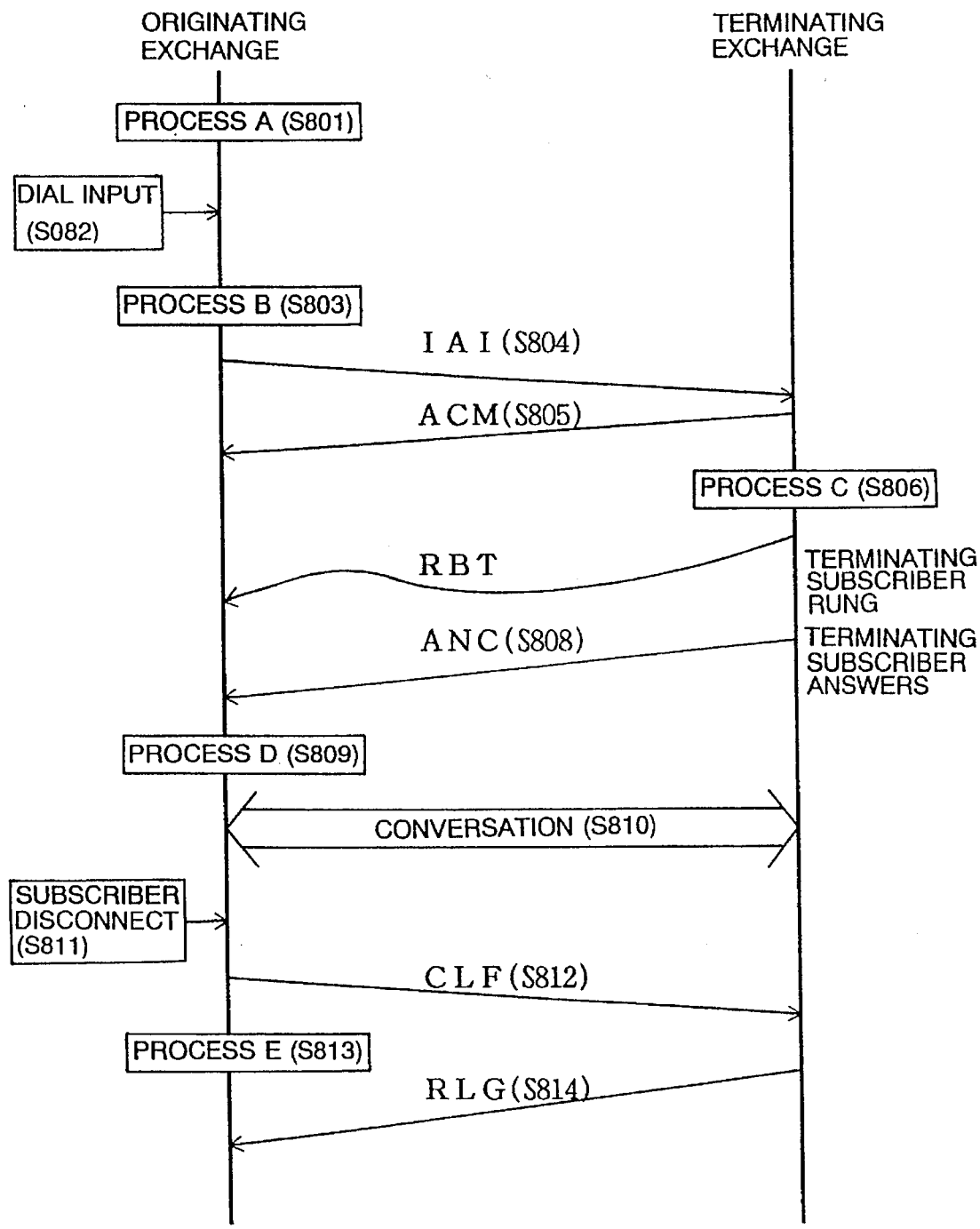
FIG. 10 is a diagram depicting the process sequence of the first embodiment.

In FIG. 5, telephones 13p1–13p3 and 13q1–13q3 are each depicted as single units, but it would be possible to install a plurality of units. Telephones 13p1–13p3 and 13q1–13q3 may alternatively be fax machines, modem-equipped computers or word processors, or the like.
Operating Procedure of First Embodiment Next, the operating procedure of the first embodiment will be described, following the sequence diagram depicted in FIG. 10.

For convenience, the description will assume telephone 13b1 to be the originating subscriber and telephone 13p1 to be the terminating subscriber.

First, during subscriber origination, the originating exchange 10b retrieves type-classified data (ordinary/public) from the originating subscriber 13b1 accommodation location data and, by assigning a relative address that indicates displacement of an "originating subscriber accommodation location data" value with respect to a specified reference value, reads out the contents of the subscriber-classified toll processing table 52 depicted in FIG. 7. The "calling side toll area data" thus read out is stored in the main memory 23 (process A (step 801)).

Next, the originating subscriber 13b1 inputs a dialed number for the terminating subscriber 13p1 (step 802). The input dialed number is transmitted to the originating exchange 10b.

Next, the originating exchange 10b analyzes the received dialing data for the terminating subscriber 13p1, calculates "toll location data" corresponding to the dialed location, and stores this in the main memory 23 (process B (step 803)).

Then the originating exchange 10b, after transmitting address signals (IAI) containing received dialing data for the terminating subscriber 13p1 to the terminating exchange 12p, assumes ringing mode (step 804).

At this point, the terminating exchange 12p, having received the address signals (IAI), transmits to the originating exchange 10b an address completion signal (ACM) notifying it that all data required for setting up the connection has been received (step 805).

Then the terminating exchange 12p retrieves dialing data from the address signals (IAI), determines the status (busy or idle) of the dialed subscriber (process C (step 806)), and, if the line is idle, assumes ringing mode and transmits a ringback tone (RBT) to the originating exchange 10b.

Next, when the terminating exchange 12p detects an answer by the terminating subscriber, an answer signal (ANC) containing "terminating toll area data" determined from terminating subscriber 13p1 accommodation location data is transmitted to the originating exchange 10b (step 808).

Next, the originating exchange 10b, having received the answer signal (ANC), designates the current time as the answer time for storage in the main memory 23, retrieves the "terminating toll area data" from the answer signal (ANC) for storage in the main memory 23 (process D (step 809)), and assumes communication mode (step 810).

Next, upon detecting that the originating subscriber 13b1 has hung up, the originating exchange 10b designates the current time as the disconnect time for storage in the main memory 23 and then transmits a disconnect signal (CLF) to the terminating exchange 12p (step 812).

Next, the originating exchange 10b computes the toll for the call between the originating subscriber 13b1 and the terminating subscriber 13p1 by performing (A) through (E), below (process E (step 813)). The reader is referred to FIG. 8 in the following description.

(A) The actual call duration is computed from the difference between the disconnect time and the answer time.

(B) The contents of a distance-classified toll processing table 61 are read out utilizing relative address assignments specifying displacement of "toll location data" values with respect to specified reference values.

(C) Values read out in (B) are designated as reference values, and the contents of a distance-classified toll processing table 62 is read out utilizing relative address assignments specifying displacement of "calling party toll area data2 values.

(D) Values read out in (C) are designated as reference values, and the contents of a distance-classified toll processing table 63 is read out utilizing relative address assignments specifying displacement of "terminating subscriber toll area data" values.

(E) The data thus read out contains basic call periods (nights, days, holidays), i.e., periods in which calls at a minimum toll unit (for example 10 yen) are possible, and computes a measured toll from the data, the actual answer time and disconnect time, and call duration.

Next, the originating exchange 10b, utilizing relative address assignments specifying displacement of the "originating subscriber telephone number" values with respect to specified reference values, updates computed measured toll charges stored in the charge record data table 71 depicted in FIG. 9. Toll charge data stored in the charge record data table 71 can be output by input of commands by maintenance staff from a console provided to the work station 27.

The terminating exchange 12p, having received a disconnect signal (CLF), transmits a restoration completion signal (RLG) notifying the completion of circuit freeing to the originating exchange 10b (step 814).

If, in the foregoing discussion, subordinate exchanges are present between the originating exchange 10b and the terminating exchange 12p, the address signals (IAI), address completion signal (ACM), RBT (ringback tone), answer signal (ANC), and disconnect signal (CLF) are passed through the subordinate exchanges.

Outline of the Second Embodiment

The second embodiment is an example of processing a call toll between an originating subscriber located in originating toll area A, B, or C and a terminating subscriber located in terminating toll area P or Q.

Terminating toll areas P and Q each comprise three toll areas, P1, P2, and P3 and Q1, Q2, and Q3, respectively.

System Structure of Second Embodiment

Figure 11:
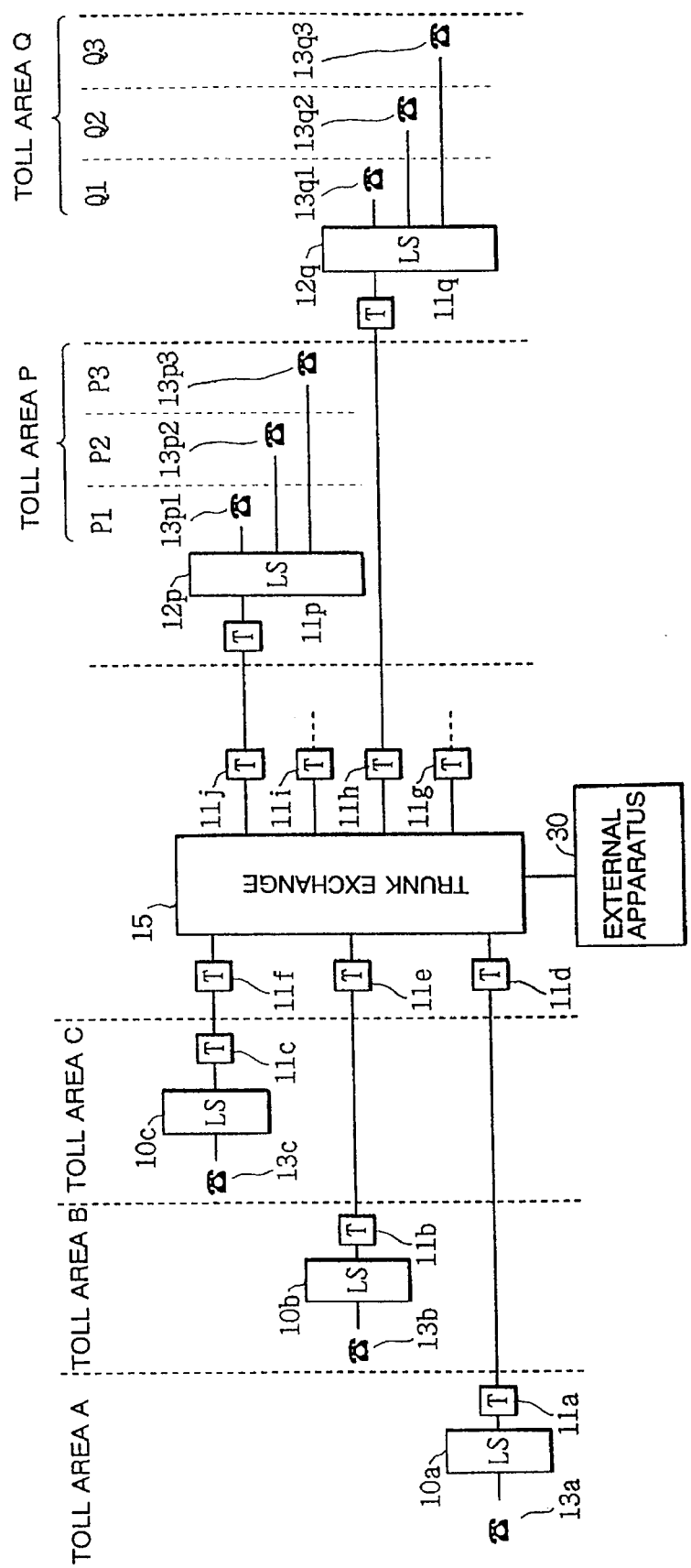
FIG. 11 is a system structure diagram of the second embodiment.

The system of the second embodiment is constructed providing the following elements (A) through (G), as depicted in FIG. 11.

(A) Telephones 13a, 13b, 13c

Telephones 13a, 13b, 13c indicate originating subscribers located in originating toll areas A, B, and C, respectively. In FIG. 11, telephones 13a, 13b, 13c are each depicted as single units, but it would be possible to install a plurality of units. Telephones 13a, 13b, and 13c may alternatively be fax machines, modem-equipped computers or word processors, or the like.

(B) Originating Exchanges 10a, 10b, 10c

The originating exchanges 10a, 10b, 10c correspond to subscriber's line (accommodating) exchanges and accommodate telephones 13a, 13b, and 13a, respectively.

(C) Trunks 11a, 11b, 11c, 11d, 11e, 11f

Trunks 11a, 11b, and 11c are connected to the originating exchanges 10a, 10b, and 10c, respectively, and connected to trunks 11d, 11e, and 11f, respectively.

(D) Trunk Exchange 15

Figure 12:
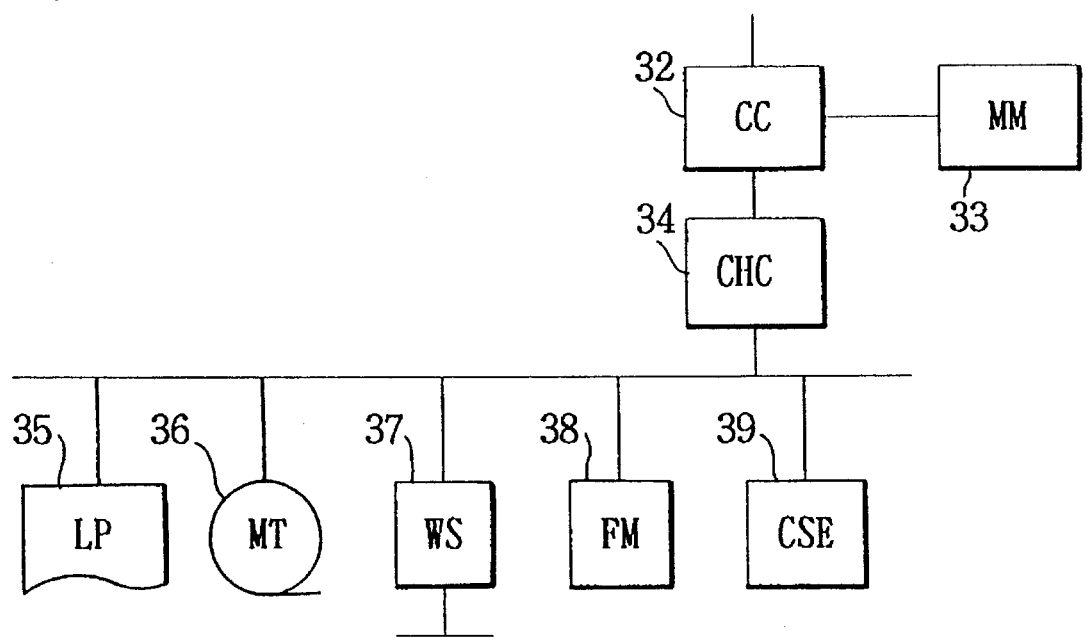
FIG. 12 is a detail structure diagram of an external apparatus for connection to the trunk exchange party.

Trunk exchange 15 is connected to 11d, 11e, and 11f, and an external apparatus 30 is connected to the exchange. As depicted in FIG. 12, the external apparatus 30 comprises (a) through (c), below.

(a) Central Controller (CC) 32

The central controller 32 is connected to the trunk exchange 15 and executes a call toll processing program.

(b) Main Memory (MM) 33

The main memory 33 is connected to the central controller 32 and stores in memory data and the program used for call toll processing program.

(c) Channel Controller (CHC) 34

The channel controller 34 is connected to the central controller 32 and controls interface between a line printer (LP) 35, a magnetic tape storage device (MT) 36, a work station (WS) 37, a file memory (FM) 38, and common channel signaling equipment (CSE) 39.

Figure 13:
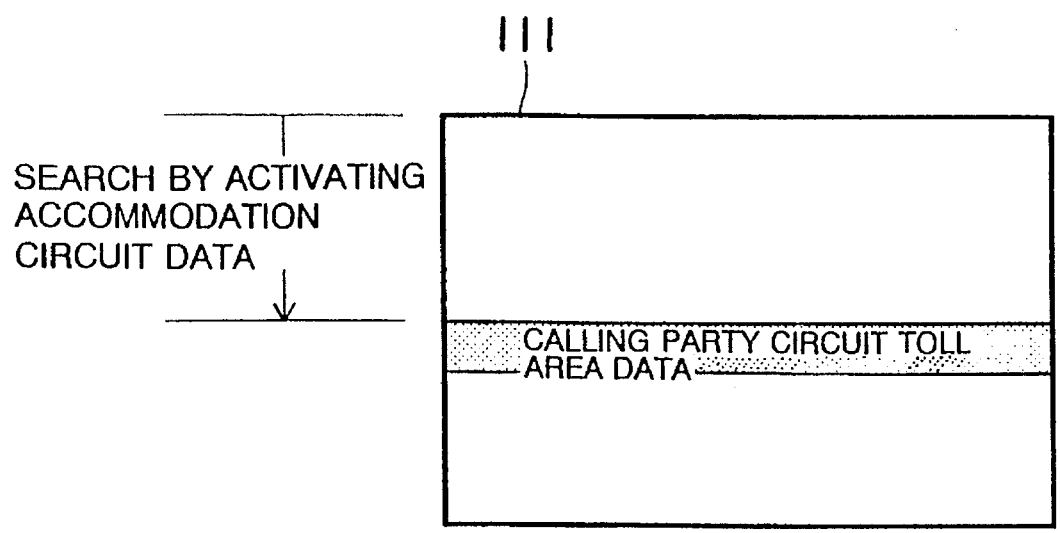
FIG. 13 is a diagram depicting the subscriber-classified toll process table of the second embodiment.
Figure 15:
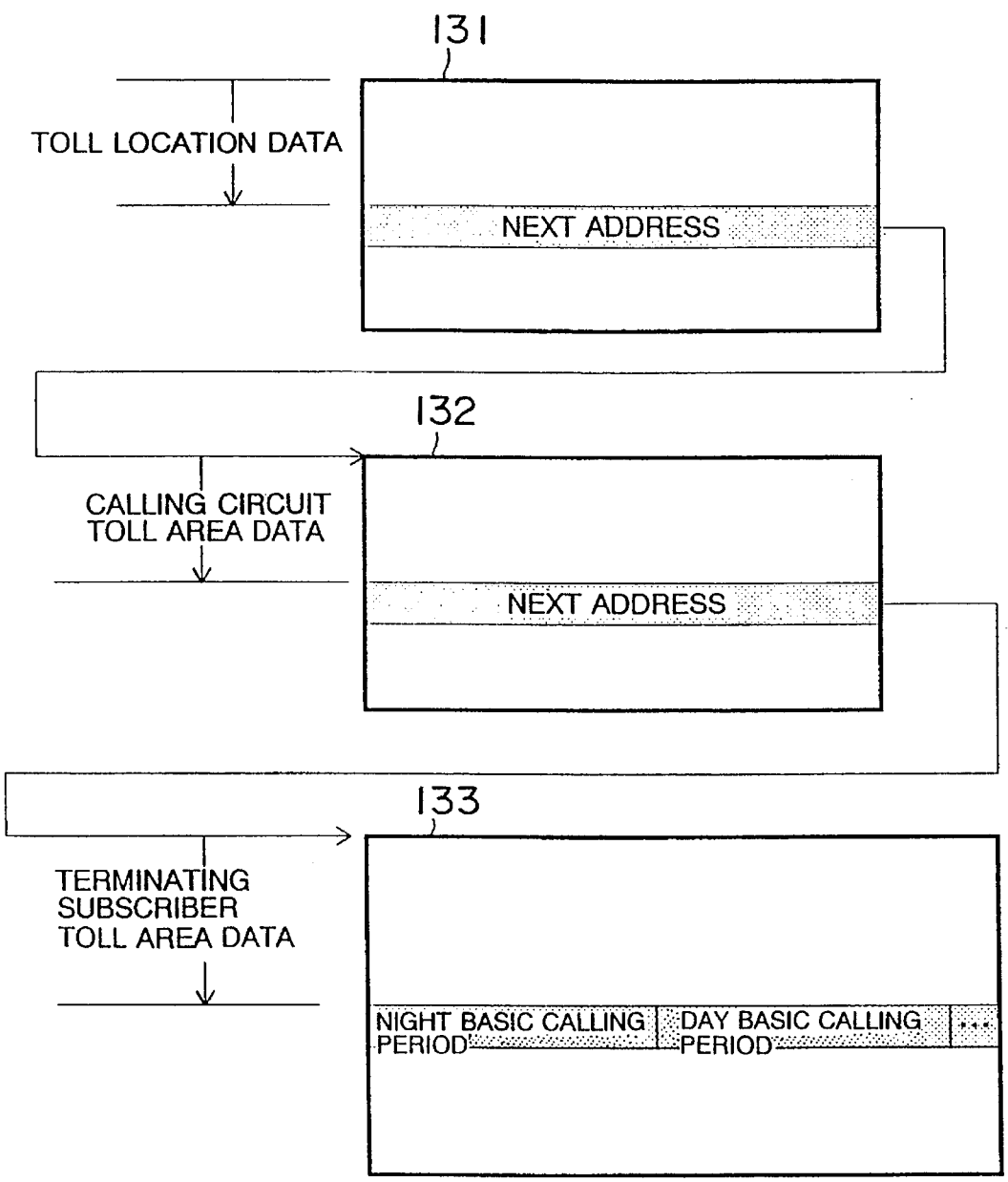
FIG. 15 is a depicting the distance-classified toll process table of the second embodiment.
Figure 16:
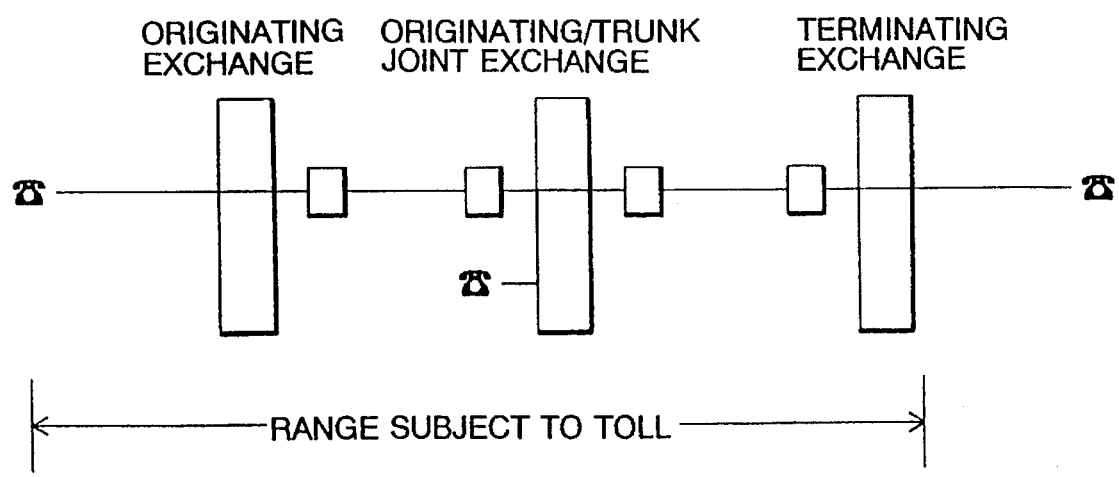
FIG. 16 is a diagram depicting the toll object range in the conventional technology.

The main memory 33 and the file memory 38 store the subscriber-classified toll processing table depicted in FIG. 13, the distance-classified toll processing table depicted in Figure in FIG. 15, and the charge record data table depicted in FIG. 9. Methods for using these table will be described in the section on operating procedure.

(E) Trunks 11g, 11h, 11i, 11j, 11p, 11q

Trunks 11g, 11h, 11i, and 11j are connected to the trunk exchange 15.

Trunk 11p is connected to trunk 11j and connected to the terminating exchange 12p.

Trunk 11q is connected to trunk 11h and connected to the terminating exchange 12q.

(F) Terminating Exchanges 12p, 12q

Terminating exchange 12p accommodates telephones 13p1, 13p2, and 13p3, which are terminating subscribers located in terminating toll areas P1, P2, and P3, respectively.

Terminating exchange 12q accommodates telephones 13q1, 13q2, and 13q3, which are terminating subscribers located in terminating toll areas Q1, Q2, and Q3, respectively (G) Telephones 13p1–13p3, 13q1–13q3

In FIG. 11, telephones 13p1–13p3 and 13q1–13q3 are each depicted as single units, but it would be possible to install a plurality of units. Telephones 13p1–13p3 and 13q1–13q3 may alternatively be fax machines, modem-equipped computers or word processors, or the like.

Operating Procedure of Second Embodiment

Figure 14:
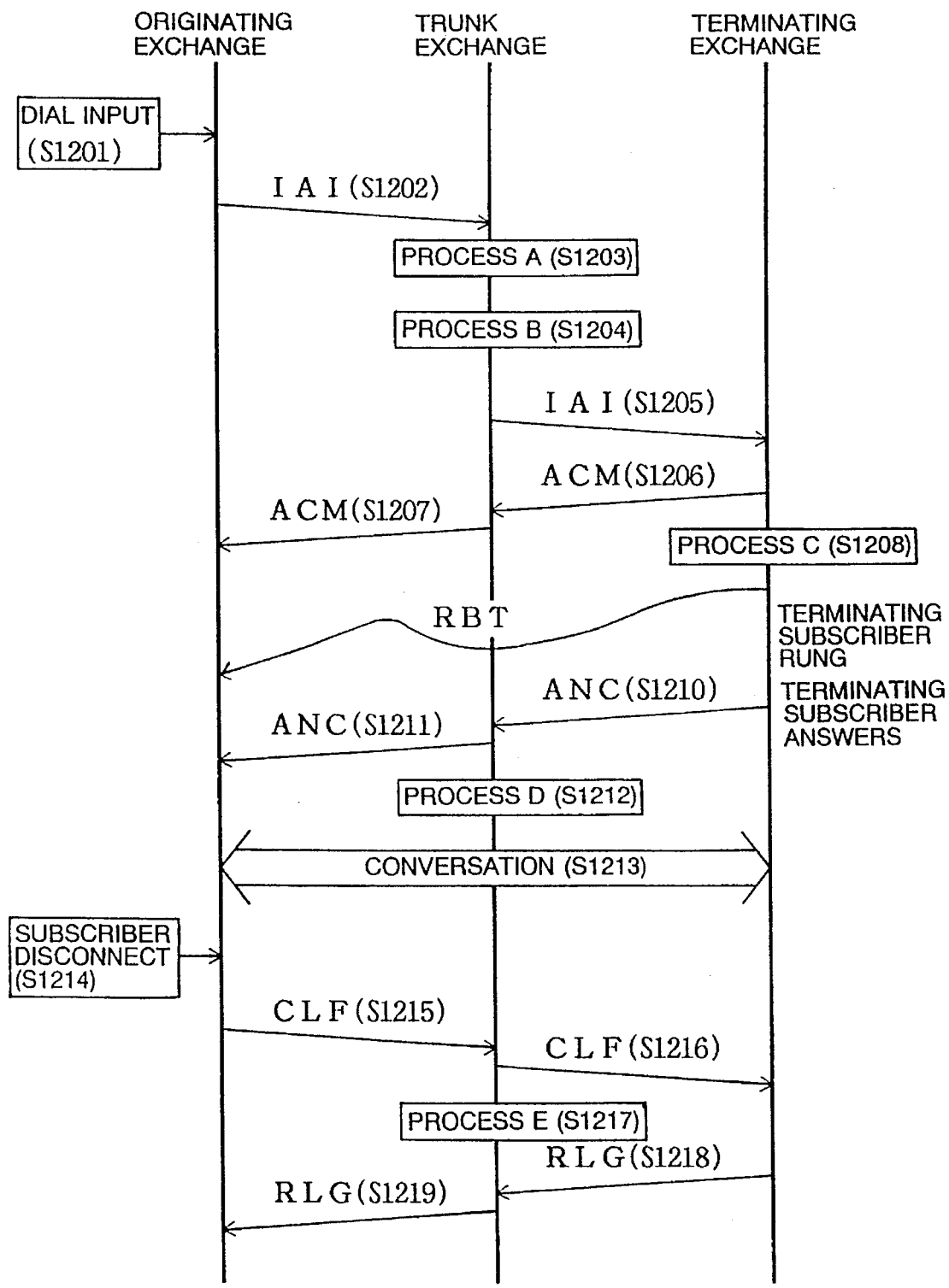
FIG. 14 is a diagram depicting the process sequence of the second embodiment.

Next, the operating procedure of the second embodiment will be described, following the sequence diagram depicted in FIG. 14. For convenience, the description will assume telephone 13b to be the originating subscriber and telephone 13p1 to be the terminating subscriber.

First, the originating subscriber 13b inputs a dialed number for the terminating subscriber 13p1 (step 1201). The input dialed number is transmitted to the originating exchange 10b.

Next, the originating exchange 10b transmits address signals (IAI) containing received dialing data for the terminating subscriber 13p1 to the trunk exchange 15.

Next, the trunk exchange 15, having received the address signals (IAI), retrieves activating accommodation circuit data from the address signals (IAI) and, utilizing relative address assignments specifying displacement of "activating accommodation circuit data" values with respect to specified reference values, reads out the contents of the subscriber-classified toll processing table 111 depicted in FIG. 13. The "calling circuit toll area data" that is read out is stored in the main memory 33 (process A (step 1203))

Next, the trunk exchange 15 analyses the received dialing data for the terminating subscriber 13p1, searches for "toll location data" corresponding to the dialed location, and stores this in the main memory 33 (process B (step 1204)).

Then the trunk exchange 15, after transmitting address signals (IAI) to the terminating exchange 12p, assumes ringing mode (step 1205)

At this point, the terminating exchange 12p, having received the address signals (IAI), transmits to the trunk exchange 15 an address completion signal (ACM) notifying it that all data required for setting up the connection has been received (step 1206).

The trunk exchange 15, having received the address completion signal (ACM), transmits the received address completion signal (ACM) to the originating exchange 10b (step 1207).

Then the terminating exchange 12p retrieves dialing data from the address signals (IAI), determines the status (busy or idle) of the dialed subscriber (process C (step 1208)), and, if the line is idle, assumes ringing mode and transmits a ringback tone (RBT) to the originating exchange 10b.

Next, when the terminating exchange 12p detects an answer by the terminating subscriber, an answer signal (ANC) containing "terminating toll area data" determined from terminating subscriber 13p1 accommodation location data is transmitted to the trunk exchange 15 (step 1210).

Next, the trunk exchange 15, having received the answer signal (ANC), transmits the received answer signal (ANC) to the originating exchange 10b (step 1211)

Next, the trunk exchange 15, having received the answer signal (ANC), designates the current time as the answer time for storage in the main memory 33, retrieves "terminating toll area data" from the answer signal (ANC) for storage in the main memory 33 (process D (step 1212)), and assumes communication mode (step 1213).

Next, upon detecting that the originating subscriber 13b has hung up, the originating exchange 10b transmits a disconnect signal (CLF) to the trunk exchange 15 (step 1215).

The trunk exchange 15, having received the disconnect signal (CLF), designates the current time as the disconnect time for storage in the main memory 33 and then transmits the received disconnect signal (CLF) to the terminating exchange 12p (step 1216).

Next, the trunk exchange 15 computes the toll for the call between the originating subscriber 13b and the terminating subscriber 13p1 by performing (A) through (E), below (process E (step 1217)). The reader is referred to FIG. 15 in the following description.

(A) The actual call duration is computed from the difference between the disconnect time and the answer time.

(B) The contents of a distance-classified toll processing table 141 are read out utilizing relative address assignments specifying displacement of "toll location data" values with respect to specified reference values.

(C) Values read out in (B) are designated as reference values, and the contents of a distance-classified toll processing table 142 is read out utilizing relative address assignments specifying displacement of "calling circuit toll area data" values.

(D) Values read out in (C) are designated as reference values, and the contents of a distance-classified toll processing table 143 is read out utilizing relative address assignments specifying displacement of "terminating subscriber toll area data" values.

(E) The data thus read out contains basic call periods (nights, days, holidays), i.e., periods in which calls at a minimum toll unit (for example 10 yen) are possible, and computes a measured toll from the data, the actual answer time and disconnect time, and call duration.

Next, the trunk exchange 15, utilizing relative address assignments specifying displacement of the "originating subscriber telephone number" values with respect to specified reference values, updates computed measured toll charges stored in the charge record data table 71 depicted in FIG. 9. Toll charge data stored in the charge record data table 71 can be output by input of commands by maintenance staff from a console provided to the work station 37.

The terminating exchange 12p, having received the disconnect signal (CLF), transmits a restoration completion signal (RLG) notifying the completion of circuit freeing to the trunk exchange 15 (step 1218).

The trunk exchange 15, having received the restoration completion signal (RLG), transmits the received restoration completion signal (RLG) to the originating exchange 10b (step 1219).

What is claimed is:

1. A telephone communication system comprising:

a plurality of telephones; and a plurality of exchanges for establishing calls among said plurality of telephones, each exchange including:

called party toll area data transmitting means for transmitting when a call is established, a called party toll area data specifying a toll area in which a called telephone is located, calling party toll area data determining means for determining a calling party toll area specifying a toll area in which a calling telephone is located, location data determining means for determining location data regarding an exchange connected to the called telephone by analyzing a dialing data inputted from the calling telephone, called party toll area data receiving means for receiving the called party toll area data transmitted by said called party toll area data transmitting means in the exchange connected to the called telephone, measuring means for measuring a duration of the call, means for obtaining a unit data from the called party toll area data received by said called party toll area data receiving means, the location data determined by said location data determining means, and the calling party toll area data determined by said calling party toll area data determining means, and call toll computing means for computing a call toll for the call on the basis of the unit data obtained by said means for obtaining a unit data and the duration measured by said measuring means.

2. The telephone communication system according to claim 1, wherein said called party toll area data transmitting means transmits the called party toll area data when the called telephone answers the call.

3. The telephone communication system according to claim 2, wherein said call toll computing means computes the call toll taking into consideration a time period and the day of the call.

4. A telephone communication system comprising:

a plurality of telephones;

a plurality of exchanges each of which is connected to at least one telephone among said telephones, each exchange including:

address signal transmitting means for transmitting an address signal containing a dialing data inputted from a calling telephone, and called party toll area data transmitting means for transmitting, when a call is established, a called party toll area data specifying a toll area in which a called telephone is located; and a trunk exchange for relaying signals between every two exchanges among said plurality of exchanges, said trunk exchange including:

trunk toll area data determining means for determining trunk toll area data specifying an exchange connected to the calling telephone on the basis of a received address signal, location data determining means for determining location data specifying an exchange connected to the called telephone using the dialing data contained in the received address signal, called party toll area data receiving means for receiving the called party toll area data transmitted by said called party toll area data transmitting means in the exchange connected to the called telephone, measuring means for measuring a duration of the call, means for obtaining a unit data from the called party toll area data received by said called party toll area data receiving means, the location data determined by said location data determining means, and the trunk toll area data determined by said trunk toll area data determining means, and call toll computing means for computing a call toll for the call on the basis of the unit data obtained by said means for obtaining a unit data and the duration measured by said measuring means.

5. The telephone communication system according to claim 4, wherein said called party toll area data transmitting means transmits the called party toll area data when the called telephone answers the call.

6. The telephone communication system according to claim 5, wherein said call toll computing means computes the call toll taking into consideration a time period and the day of the call.

* * * * *